(12) United States Patent
Shiga et al.

(10) Patent No.: US 9,415,816 B2
(45) Date of Patent: Aug. 16, 2016

(54) SPOILER DEVICE FOR VEHICLE

(71) Applicant: AISIN SEIKI KABUSHIKI KAISHA, Kariya-shi, Aichi-ken (JP)

(72) Inventors: Tokuhiro Shiga, Anjo (JP); Yoshimasa Asano, Kariya (JP); Shuhei Uchida, Chiryu (JP); Kenji Hori, Toyota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/825,251

(22) Filed: Aug. 13, 2015

(65) Prior Publication Data

US 2016/0059911 A1    Mar. 3, 2016

(30) Foreign Application Priority Data

Aug. 26, 2014  (JP) .................................. 2014-171608

(51) Int. Cl.
  *B62D 35/00*    (2006.01)
(52) U.S. Cl.
  CPC .................................... *B62D 35/007* (2013.01)
(58) Field of Classification Search
  CPC ...................................................... B62D 35/007
  USPC ................................ 296/180.1, 180.3, 180.5
  See application file for complete search history.

(56) References Cited

U.S. PATENT DOCUMENTS

| 4,773,692 A | * | 9/1988 | Schleicher | ........... | B62D 35/007 |
| | | | | | 296/180.5 |
| 7,841,646 B2 | | 11/2010 | Paul et al. | | |
| 2012/0223545 A1 | * | 9/2012 | Goenueldinc | ........ | B62D 35/007 |
| | | | | | 296/180.5 |
| 2015/0091325 A1 | | 4/2015 | Shiga et al. | | |

* cited by examiner

*Primary Examiner* — Joseph D Pape
(74) *Attorney, Agent, or Firm* — Finnegan, Henderson, Farabow, Garrett & Dunner, LLP (57) ABSTRACT

A spoiler device for a vehicle includes a spoiler, a support mechanism supporting the spoiler, the support mechanism adjusting the spoiler to be positioned at a deployed position where the spoiler protrudes from an outer surface of the vehicle, the support mechanism adjusting the spoiler to be positioned at a retracted position where the spoiler is retracted within a housing recessed portion, the housing recessed portion being formed at the outer surface of the vehicle, a fixing member fixing the spoiler to the support mechanism, and a first tubular member and a second tubular member into which the fixing member is inserted, the first tubular member being provided with a first threaded portion at a first circumferential surface, the second tubular member being provided with a second threaded portion at a second circumferential surface, the first threaded portion and the second threaded portion being threadedly engaged with each other.

4 Claims, 8 Drawing Sheets

SPOILER DEVICE FOR VEHICLE

CROSS REFERENCE TO RELATED APPLICATIONS

This application is based on and claims priority under 35 U.S.C. §119 to Japanese Patent Application 2014-171608, filed on Aug. 26, 2014, the entire content of which is incorporated herein by reference.

TECHNICAL FIELD

This disclosure generally relates to a spoiler device for a vehicle.

BACKGROUND DISCUSSION

A known movable spoiler device for a vehicle that supports a spoiler and is configured to deploy the spoiler at a position where the spoiler protrudes from an outer surface of the vehicle and to retract the spoiler in a housing portion provided at the vehicle is disclosed in U.S. Pat. No. 7,841,646B (hereinafter referred to as Patent reference 1). For example, the spoiler device disclosed in Patent reference 1 is provided with known link mechanisms that support the spoiler to be movable in an up-down direction. A rear lid provided at a rear portion of the vehicle includes a housing recessed portion that opens at the outer surface of the vehicle. The spoiler device disclosed in Patent reference 1 moves the spoiler that is in a retracted position within the housing recessed portion to a deployed position on a basis of a drive force of a motor that is connected to the link mechanisms.

Meanwhile, according to the configuration of the spoiler device that retracts the spoiler in the housing recessed portion provided at the outer surface of the vehicle disclosed in Patent reference 1, it is favorable that the outer surface of the vehicle and an upper surface of the spoiler are flush with each other. However, a difference in level may occur between the outer surface of the vehicle and the upper surface of the spoiler due to a manufacturing error or a mounting error of parts that configure a support mechanism of the spoiler, for example, the link mechanisms. Thus, the aerodynamic characteristics and the designability may be degraded.

A need thus exists for a spoiler device for a vehicle which is not susceptible to the drawback mentioned above.

SUMMARY

A spoiler device for a vehicle includes a spoiler, a support mechanism supporting the spoiler, the support mechanism adjusting the spoiler to be positioned at a deployed position where the spoiler protrudes from an outer surface of the vehicle, the support mechanism adjusting the spoiler to be positioned at a retracted position where the spoiler is retracted within a housing recessed portion, the housing recessed portion being formed at the outer surface of the vehicle, a fixing member fixing the spoiler to the support mechanism, and a first tubular member and a second tubular member into which the fixing member is inserted, a first tubular member and a second tubular member into which the fixing member is inserted, the first tubular member being provided with a first threaded portion at a first circumferential surface, the second tubular member being provided with a second threaded portion at a second circumferential surface, the first threaded portion and the second threaded portion being threadedly engaged with each other.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
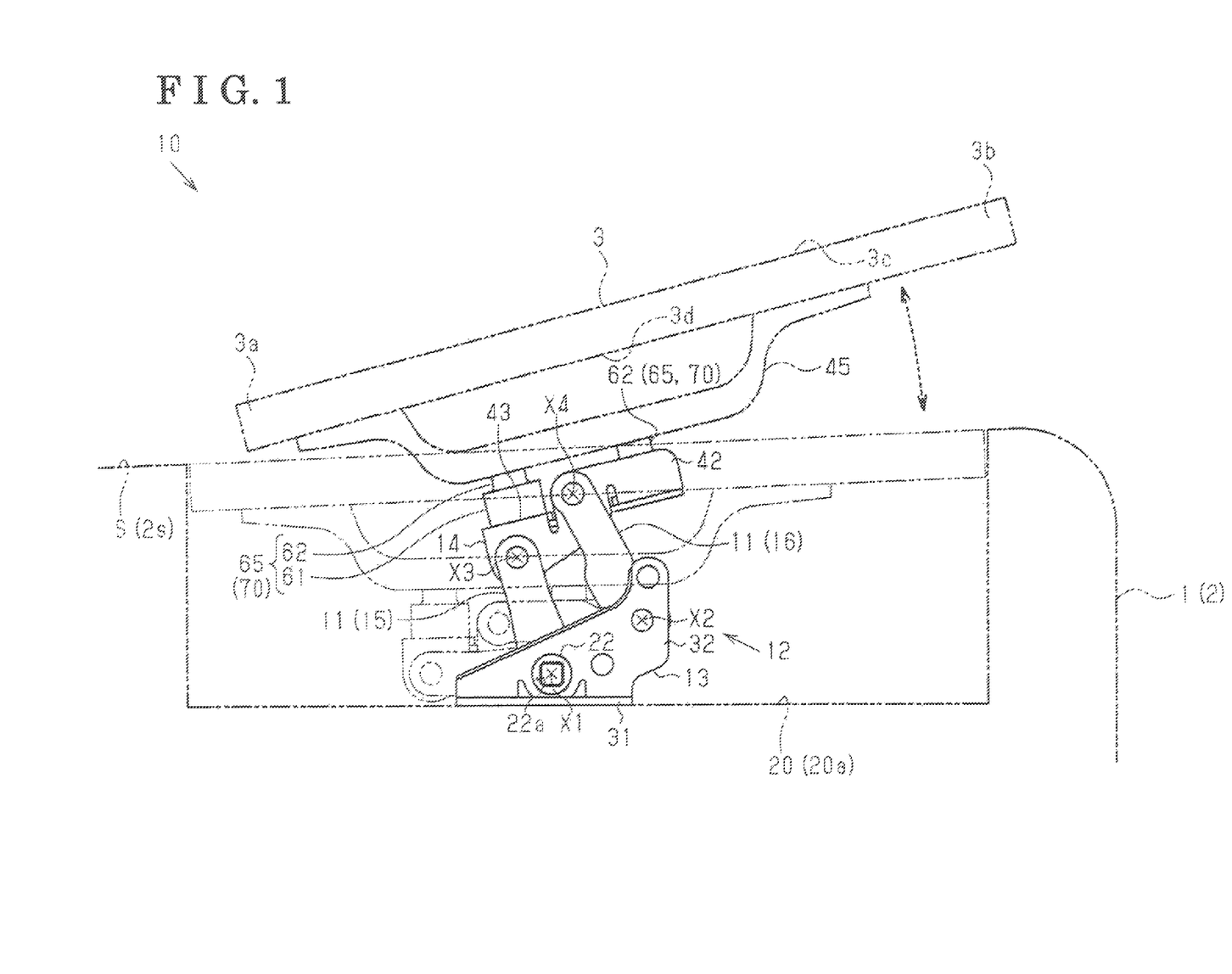
FIG. 1 is a side view schematically illustrating a spoiler device according to an embodiment disclosed here.
Figure 2:
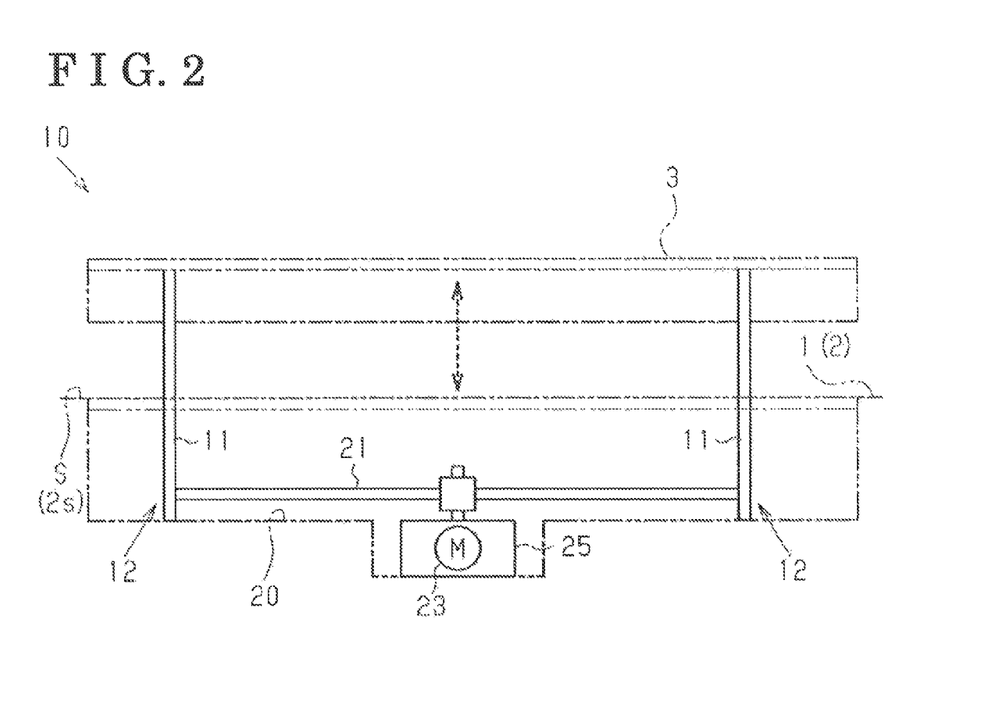
FIG. 2 is a rear view schematically illustrating the spoiler device.

An embodiment of a spoiler device for a vehicle will hereunder be explained with reference to the drawings. As shown in FIGS. 1 and 2, a trunk lid 2 provided at a rear of a vehicle 1 is provided with a spoiler 3 that establishes a deployed state when the spoiler 3 is supported above the trunk lid 2, the deployed state where the spoiler 3 protrudes from an outer surface 2s of the trunk lid 2 (an outer surface S of the vehicle 1). The vehicle 1 of the embodiment is provided with a spoiler device 10 that can change aerodynamic characteristics of the vehicle 1 by the change of the deployed state of the spoiler 3.

Specifically, the spoiler 3 of the embodiment has a wing-shaped external shape extending in a vehicle width direction (a right-left direction in FIG. 2). The trunk lid 2 is provided with plural link mechanisms 12 (i.e., serving as a support mechanism) that support the spoiler 3 at an upper portion of the link mechanisms 12 via pivotable link members 11. In particular, the trunk lid 2 of the embodiment includes a pair of the right-and-left link mechanisms 12 that is spaced apart from each other in the vehicle width direction. According to the spoiler device 10 of the embodiment, the deployed state of the spoiler 3 can be changed by the actuation of the link mechanisms 12.

As shown in FIGS. 1, 3A, 3B and 4 to 7, each of the link mechanisms 12 includes a lower bracket 13 that is fixed to the trunk lid 2 and an upper bracket 14 (i.e., serving as a support member) that is fixed to the spoiler 3. The link mechanism 12 of the embodiment includes a known link construction that connects the lower bracket 12 and the upper bracket 14 by, for example, the two link members 11 (a front link 15 and a rear link 16).

Figure 8:
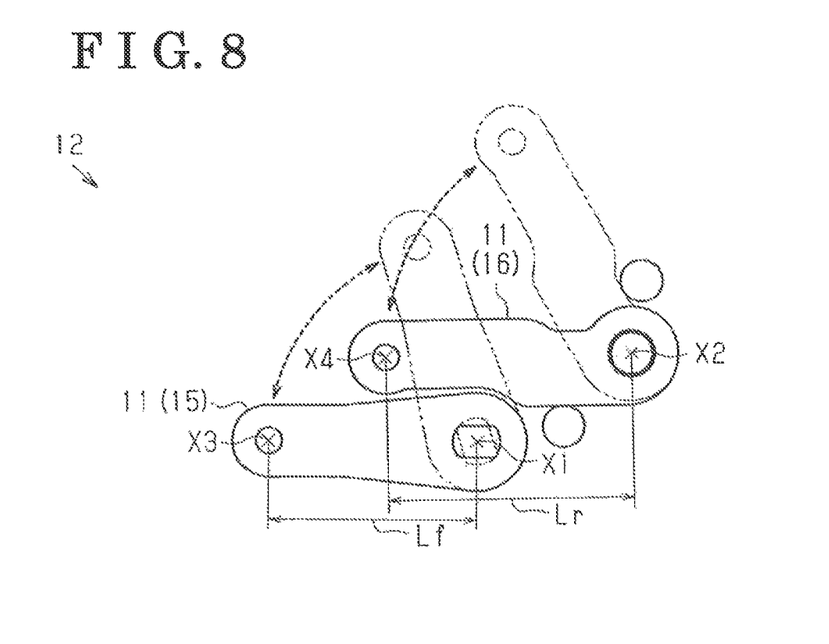
FIG. 8 is an operation explanatory view of the link mechanism.
Figure 9A:
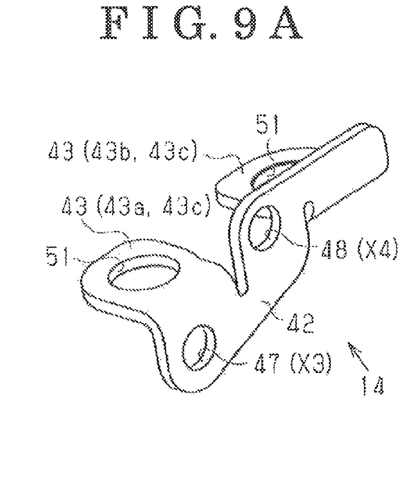
FIG. 9A is a perspective view of the upper bracket.
Figure 9B:
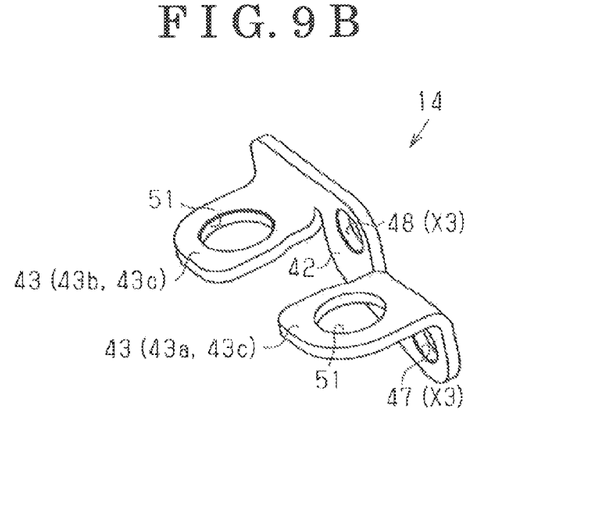
FIG. 9B is another perspective view of the upper bracket.
Figure 10A:
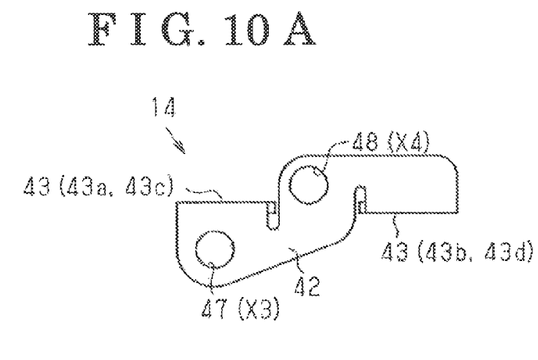
FIG. 10A is a side view of the upper bracket.
Figure 10B:
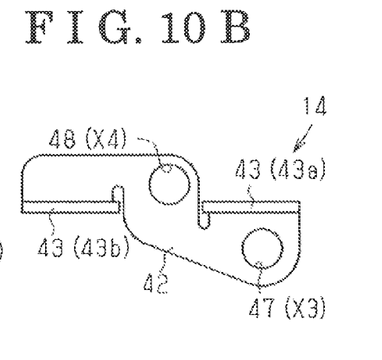
FIG. 10B is another side view of the upper bracket.
Figure 11A:
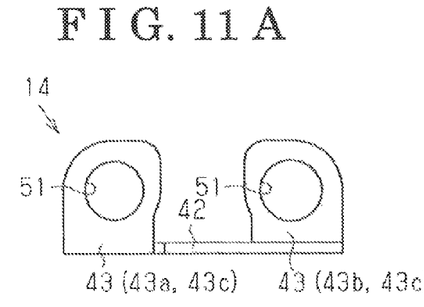
FIG. 11A is a plan view of the upper bracket.
Figure 11B:
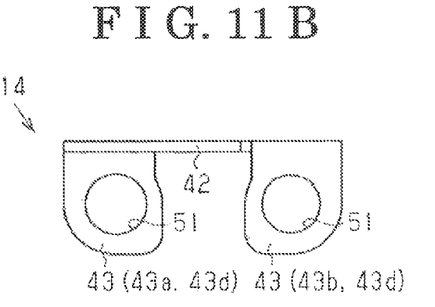
FIG. 11B is a bottom view of the upper bracket.

As shown in FIGS. 1 and 8, according to the front link 15 and the rear link 16 of the link mechanism 12 of the embodiment, each of connection points X3, X4 relative to the upper bracket 14 is positioned ahead of the vehicle (left in FIGS. 1 and 8) relative to each of connection points X1, X2 relative to the lower bracket 13.

That is, according to the link mechanisms 12 of the embodiment, because each of the link members 11 rotates in the clockwise direction in FIGS. 1 and 8 to move the corresponding connection points X3, X4 relative to the upper bracket 14 to the rear of the vehicle, the spoiler 3 fixed to the upper bracket 14 that serves as a support member moves upwardly (to establish the deployed state). Because each of the link members 11 rotates in the anticlockwise direction in FIGS. 1 and 8 to move the corresponding connection points X3, X4 relative to the upper bracket 14 to the front of the vehicle, the spoiler 3 fixed to the upper bracket 14 moves downwardly (to establish the retracted state).

As shown in FIG. 8, according to the embodiment, a link length Lr (a length between the connection points X2, X4) of the rear link 16 is set longer than a link length Lf (a length between the connection points X1, X3) of the front link 15 (Lf<Lr). Thus, as shown in FIG. 1, according to the link mechanisms 12 of the embodiment, a rear end portion 3b of the spoiler 3 is configured to be lifted higher than a front end portion 3a of the spoiler 3 when the spoiler 3 that is supported by the link mechanisms 12 moves upwardly.

As shown in FIGS. 1 and 2, according to the embodiment, the trunk lid 2 includes a housing recessed portion 20 that opens at the outer surface 2s of the trunk lid 2. A shape of an opening of the housing recessed portion 20 is formed in a quadrilateral shape that is substantially the same as a shape of an upper surface of the spoiler 3. Each of the link mechanisms 12 is fixed within the housing recessed portion 20.

That is, because the link mechanisms 12 configuring the support mechanism come to be in a folded state, the spoiler device 10 of the embodiment retracts the spoiler 3 that is supported at the upper portion of the link mechanisms 12. The spoiler 3 of the embodiment is retracted within the housing recessed portion 20 in a manner that an opening portion of the housing recessed portion 20 is closed. In particular, an upper surface 3c of the spoiler 3 and the outer surface 2s of the trunk lid 2, that is, the outer surface S of the vehicle 1 are in a substantially planar manner, or the upper surface 3c of the spoiler 3 and the outer surface 2s of the trunk lid 2 are substantially flush with each other. According to the spoiler device 10 of the embodiment, because the link mechanisms 12 come to be in the deployed state, the spoiler 3 that is supported at the upper portion of the link mechanisms 12 can move, or can be adjusted to the deployed position where the spoiler 3 protrudes to outside the housing recessed portion 20, that is, the spoiler 3 protrudes from the outer surface S of the vehicle 1.

Figure 3A:
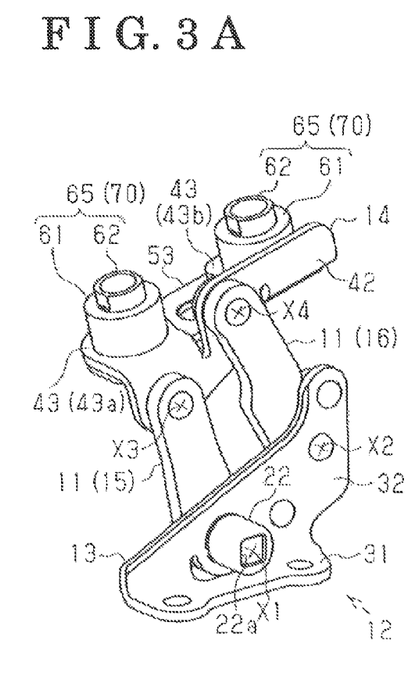
FIG. 3A is a perspective view of a link mechanism, a first tubular member and a second tubular member.
Figure 3B:
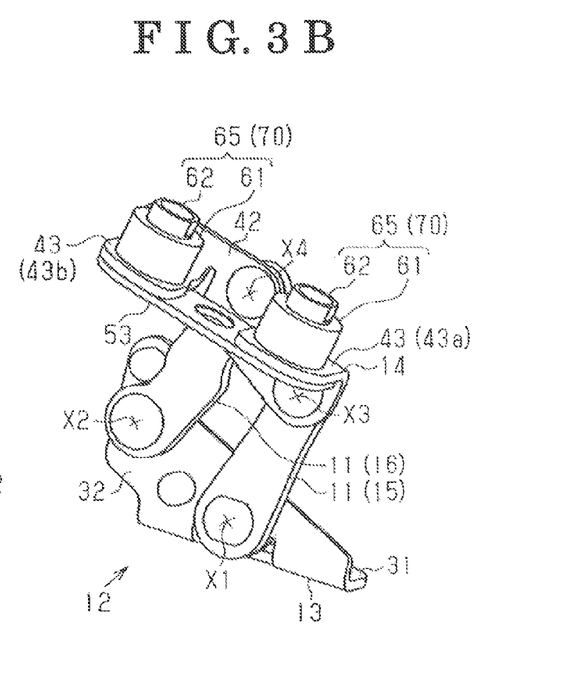
FIG. 3B is another perspective view of the link mechanism; the first tubular member and the second tubular member.
Figure 4:
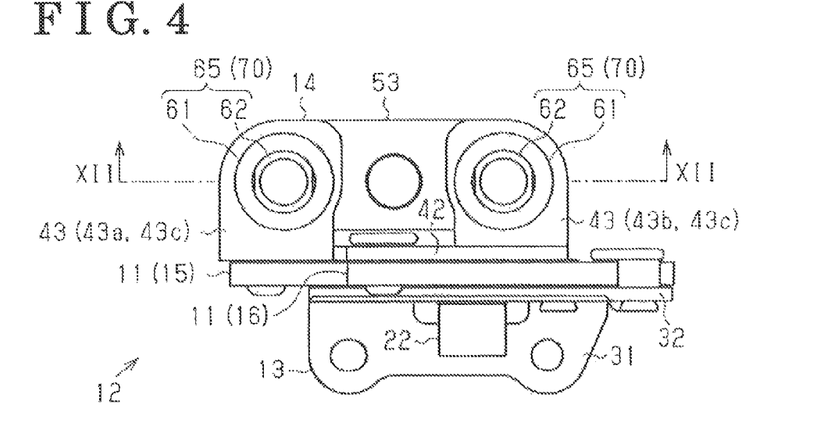
FIG. 4 is a plan view of the link mechanism and the first and second tubular members.
Figure 5:
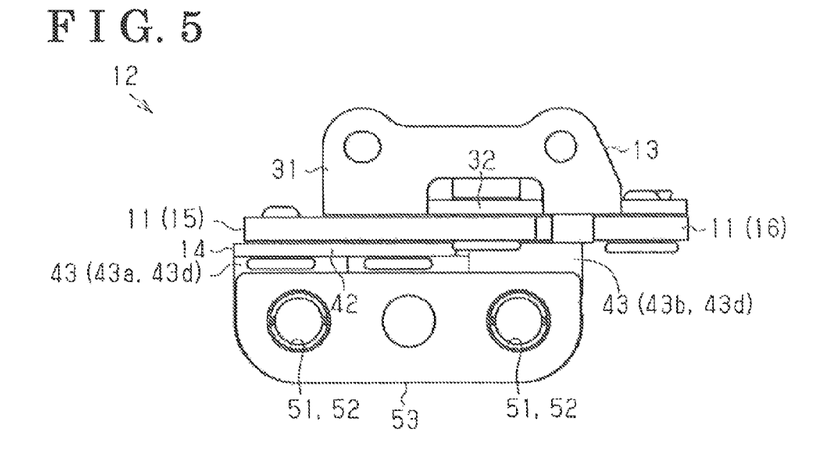
FIG. 5 is a bottom view of the link mechanism and a fixed plate.
Figure 6:
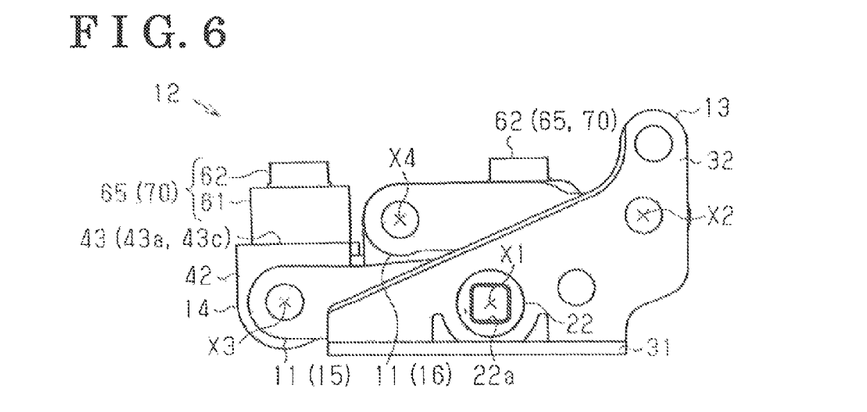
FIG. 6 is a side view of the link mechanism and the first and second tubular members seen from a side of a lower bracket.
Figure 7:
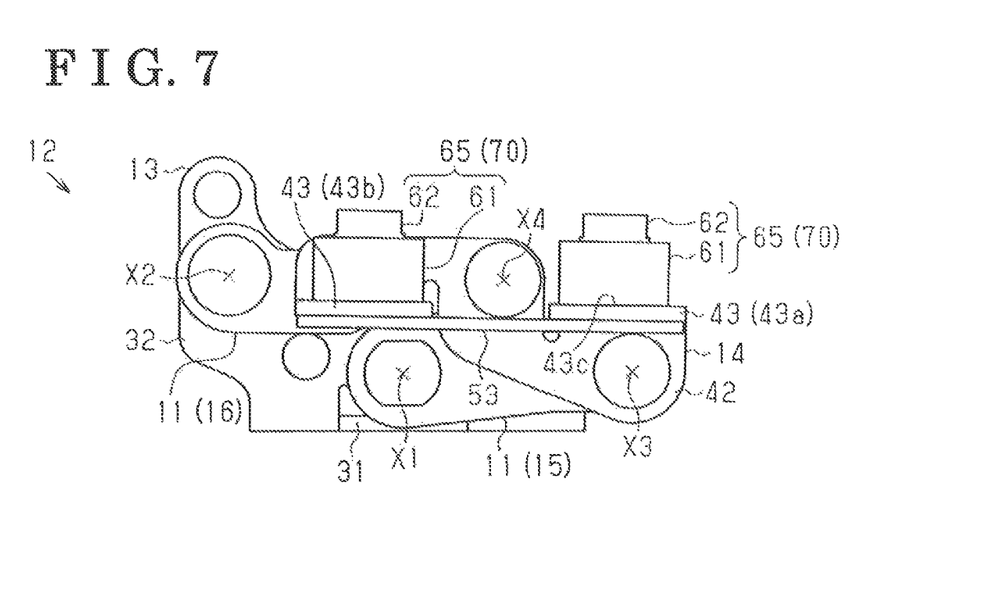
FIG. 7 is a side view of the link mechanism and the first and second tubular members seen from a side of an upper bracket.

As shown in FIG. 2, the spoiler device 10 of the embodiment includes a connection shaft 21 connecting each of the link mechanisms 12 spaced apart from each other in the vehicle width direction. The connection shaft 21 of the embodiment is connected to base end portions of the front links 15 that configure the link mechanisms 12, in particular, is connected to connection pins 22. The connection pins 22 configure the connection points X1 relative to the lower bracket 13. As shown in FIGS. 3A and 6, each of the connection pins 22 includes a connection recessed portion (a quadrilateral hole) 22a into which an end portion of the connection shaft 21 in the axial direction is inserted to be positioned in the connection recessed portion 22a. The connection shaft 21 is connected to an actuator 25 that has a motor 23 as a drive source. According to the spoiler device 10 of the embodiment, because the connection shaft 21 rotates in response to a drive force of the motor 23, the spoiler 3 supported at the upper portion of the link mechanisms 12 can be deployed to a position where the spoiler 3 protrudes from the outer surface 3 of the vehicle 1 and can be retracted within the housing recessed portion 20 provided at the outer surface S.

Next, a support position adjustment mechanism of the spoiler 3 provided at the spoiler device 10 of the embodiment will be explained.

As shown in FIGS. 9A, 9B, 10A, 10B, 11A and 11B, the upper bracket 14 configuring the link mechanism 12 is formed by bending a plate member. In the embodiment, similarly, the lower bracket 13 is formed by bending a plate member. Each of the link members 11 (the front link 15 and the rear link 16) is formed by the deformation processing (press processing) of the plate member.

As shown in FIGS. 1 and 3 to 7, the lower bracket 13 of the embodiment includes a base portion 31 being fixed to a bottom portion 20a of the housing recessed portion 20 and a sidewall portion 32 that is relatively rotatably connected to base ends (the connection points X1, X2) of the link members 11 (the front link 15 and the rear link 16) to be formed in a bending shape having a substantially L-shape. The upper bracket 14 includes a sidewall portion 42 and support portions 43. The sidewall portion 42 is relatively rotatably connected to a distal end (the connection points X3, X4) of the link members 11 (the front link 15 and the rear link 16). The support portions 43 include respective upper surfaces 43c that are fixed to the spoiler 3.

Figure 12:
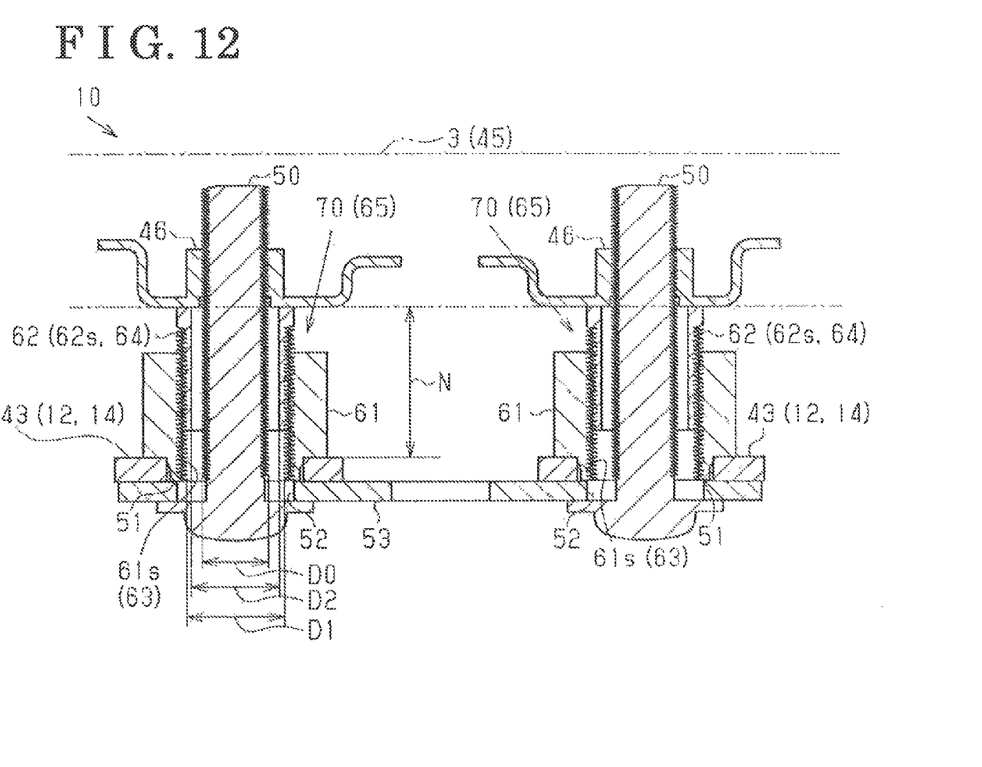
FIG. 12 is a cross-sectional view of the link mechanisms and the first and second tubular members taken along line XII-XII in FIG. 4.

As shown in FIG. 1, a fixed portion 45 for fixing the spoiler 3 to the upper brackets 14 of the link mechanisms 12 is provided at a lower surface 3d of the spoiler 3. As shown in FIG. 12, the fixed portion 45 of the embodiment is provided with plural nut portions 46. Accordingly, opposing end portions of the spoiler 3 in the width direction are fixed to the support portions 43 of the upper bracket 14 (see FIG. 2).

As shown in FIGS. 9A to 11B, the upper bracket 14 of the embodiment includes the support portions 43 that are provided with a first support plate portion 43a and a second support plate portion 43b, respectively. The first support plate portion 43a is formed by bending an upper end of the sidewall portion 42. The second support plate portion 43b is formed by bending a lower end of the sidewall portion 42.

As shown in FIGS. 9A, 9B, 10A and 10B, the sidewall portion 42 of the embodiment includes a connection hole 47 that configures the connection point X3 of the front link 15 relative to the upper bracket 14 because a connection pin is inserted into the connection hole 47 to be positioned in the connection hole 47. The connection hole 47 is provided at a position that is lower than the first and second support plate portions 43a, 43b that configure the support portions 43 (lower portion in FIG. 10A, 10B). Similarly, the sidewall portion 42 includes a connection hole 48 that configures the connection point X4 of the rear link 16. The connection hole 48 is provided at a position that is higher than the first and second support plate portions 43a, 43b (upper portion in FIG. 10A, 10B).

As shown in FIGS. 9A, 9B, 11A and 11B, each of the first and second support plate portions 43a, 43b is provided with a through hole 51 into which a bolt 50 serving as a fixing member is inserted to be positioned through the through hole 51. Further, as shown in FIGS. 3A to 7 and 12, according to the embodiment, a lower portion of the support portions 43 that are configured by the first and second support plate portions 43a, 43b is attached with a fixed plate 53. The fixed plate 53 includes a pair of through holes 52 into which the bolts 50 are inserted, respectively, to be positioned through the through holes 52. According to the spoiler device 10 of the embodiment, because the bolts 50 being inserted into the through holes 51, 52 to be positioned through the through holes 51, 52 are threadedly engaged with the nut portions 46 of the fixed portion 45, the spoiler 3 is fixed to the support portions 43 of the upper brackets 14 that are provided at a distal end of the link mechanisms 12.

As shown in FIG. 12, a first tubular member 61 and a second tubular member 62 into which the bolts 50 are inserted, respectively, to be positioned in the first and second tubular members 61, 62 are positioned between the fixed portion 45 of the spoiler 3 and the support portions 43 of the upper brackets 14. In particular, an inner diameter D1 of the first tubular member 61 is larger than an inner diameter D2 of the second tubular member 62 (D1>D2). Further, the inner diameter D2 of the second tubular member 62 is formed larger than a diameter D0 (of a threaded shaft part) of the bolt 50 (D2>D0). An inner circumferential surface 61s (i.e., serving as a first circumferential surface) of the first tubular member 61 is provided with a first threaded portion 63. An outer circumferential surface 62s (i.e., serving as a second circumferential surface) of the second tubular member 62 is provided with a second threaded portion 64. That is, according to the embodiment, because the first tubular members 61 is threadedly engaged with the second tubular members 62, a collar (spacer) 65 that can change a shaft length N on a basis of a threaded relationship (a threaded pair) is provided. According to the spoiler device 10 of the embodiment, the collar 65 serving as a support position adjustment mechanism 70 can perform the position adjustment of the spoiler 3 that is supported by the link mechanisms 12.

Figure 13:
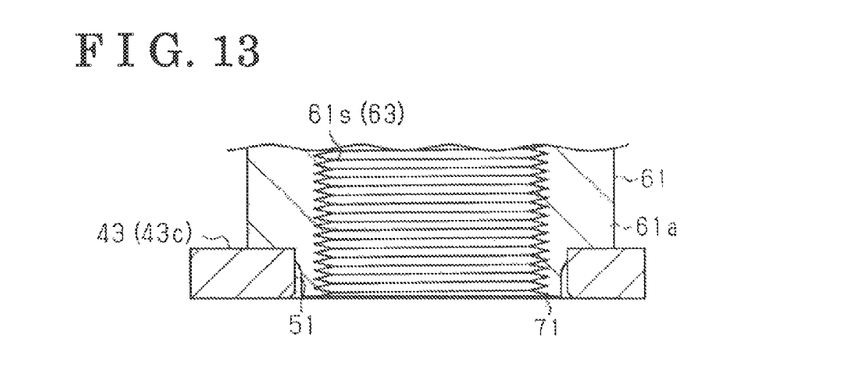
FIG. 13 is an enlarged cross-sectional view of the first tubular member that is in contact with a support portion of the upper bracket.
Figure 14:
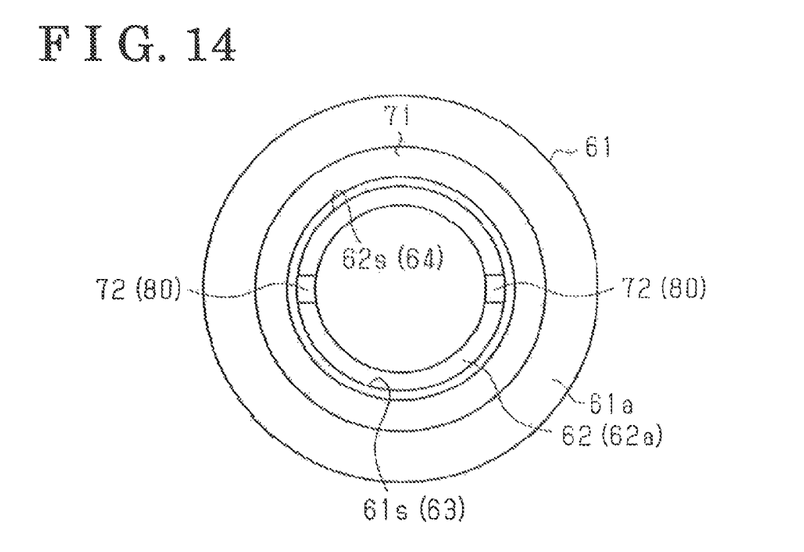
FIG. 14 is a bottom view of the second tubular member that includes an engagement portion provided at an axial end portion of the second tubular member.

As shown in FIG. 13, according to the embodiment, a first axial end portion of the first tubular member 61 (a first axial end portion 61a) is provided with a small diameter portion 71 that is inserted into the through hole 51 to be positioned in the through hole 51 that is provided at the support portion 43. The first axial end portion 61a of the first tubular member 61 including the small diameter portion 71 is fixed to an upper surface 43c of the support portion 43. As shown in FIG. 14, the second tubular member 62 includes an operation input portion 80 that rotates the second tubular member 62 relative to the first tubular member 61.

Figure 15A:
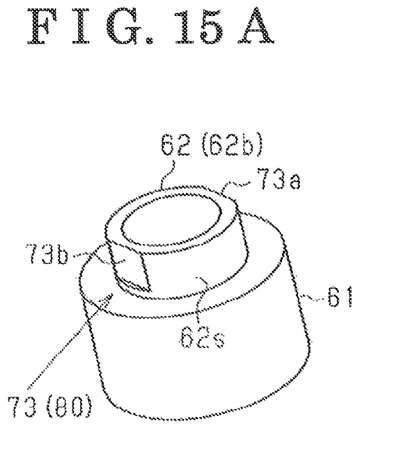
FIG. 15A is a perspective view of a width-across-flat portion provided at the second tubular member.
Figure 15B:
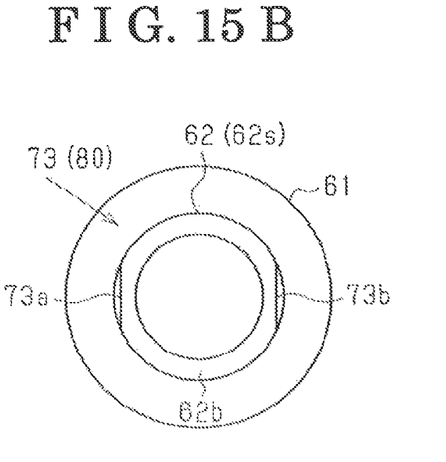
FIG. 15B is a plan view of the width-across-flat portion.

As shown in FIG. 14, because the first and second tubular members 61, 62 are threadedly engaged with each other, a first axial end portion of the second tubular member 62 (the first axial end portion 62a) that is positioned within the first tubular member 61 includes slit-shaped engagement portions 72 that are disposed at two positions being spaced apart from each other by substantially 180 degrees in the circumferential direction. As shown in FIGS. 15A and 15B, a second axial end portion of the second tubular member 62, that is, (an outer circumferential surface 62s of) a second axial end portion 62b protruding outside the first tubular member 61 is provided with a width-across-flat portion 73 (i.e., serving as a grip portion) that includes a pair of flat surface portions 73a, 73b being positioned in parallel with each other. According to the embodiment, because the engagement portions 72 and the width-across-flat portion 73 serve as the operation input portion 80, the first and second tubular members 61, 62 that are threadedly engaged with each other can be relatively rotated with each other easily.

That is, according to the support position adjustment mechanism 70 of the embodiment, a tool (for example, a flat screw driver) can be inserted into the first tubular member 61 from a side where the first axial end portion 61a is positioned via the through hole 51 for the bolt 50 that is provided at the support portion 43 of the upper bracket 14. Because the tool comes to be engaged with the first axial end portion 62a of the second tubular member 62, the first and second tubular members 61, 62 can relatively rotate with each other.

According to the support position adjustment mechanism 70 of the embodiment, because the width-across-flat portion 73 (configured by the flat surface portions 73a, 73b) serves as a grip portion, the first and second tubular members 61, 62 can relatively rotate with each other. Because the axial length N of the collar 65 (that is configured by the first and second tubular members 61, 62) based on the screw relationship is changed, the position adjustment of the spoiler 3 that is supported by the link mechanisms 12 can be performed.

According to the embodiment, following effects and advantages may be attained.

The spoiler device (10) includes the spoiler (3), the support mechanism (the link mechanism 12) supporting the spoiler (3), the support mechanism (the link mechanism 12) adjusting the spoiler (3) to be positioned at the deployed position where the spoiler (3) protrudes from the outer surface (S) of the vehicle (1), the support mechanism (the link mechanism 12) adjusting the spoiler (3) to be positioned at the retracted position where the spoiler (3) is retracted within the housing recessed portion (20), the housing recessed portion (20) that is formed at the outer surface (S) of the vehicle (1), the fixing member (the bolt 50) fixing the spoiler (3) to the support mechanism (the link mechanism 12), and the first tubular member (61) and the second tubular member (62) into which the fixing members (the bolts 50) are inserted, respectively, the first tubular member (61) being provided with a first threaded portion (63) at a first circumferential surface (61s), the second tubular member (62) being provided with a second threaded portion (64) at a second circumferential surface (62s), the first threaded portion (63) and the second threaded portion (64) being threadedly engaged with each other.

According to the aforementioned construction, because the first and second tubular members 61, 62 relatively rotate with each other, the first and second tubular members 61, 62 can change the axial length N of the spacer (the collar 65) that is positioned between the spoiler 3 and the link mechanisms 12 based on the screw relationship (screw pair). Thus, the space between (the fixed portion 45 of) the spoiler 3 and (the upper brackets 43 of) the link mechanisms 12 that are fixed with the bolt 50 can be precisely adjusted with a simple configuration while maintaining high support stiffness. That is, the position adjustment of the spoiler 3 that is supported by the link mechanisms 12 in an axial direction of the bolt 50 can be precisely performed with a simple configuration while maintaining high support stiffness. In addition, a large adjustment stroke can be maintained. As a result, the spoiler 3 can be stored in the housing recessed portion 20 so as to make the upper surface 3c of the spoiler 3 be flush with the outer surface S of the vehicle 1. Thus, the enhanced aerodynamic characteristics and the high designability can be maintained.

The first tubular member (61) includes the inner diameter (D1) being larger than the diameter (D0) of the fixing member (the bolt 50) and the second tubular member (62) includes the inner diameter (D2) being larger than the diameter (D0) of the fixing member (the bolt 50).

That is, the shaft displacement of the first and second tubular members 61, 62 that are threadedly engaged with each other do not easily occur. Thus, according to the aforementioned embodiment, the position adjustment of the spoiler 3 that is positioned in a plane orthogonal to the axis of the bolt 50 or that is positioned in a plane direction along the outer surface S of the vehicle 1 can be performed with the simple configuration while maintaining the high support stiffness.

The first circumferential surface (61s) of the first tubular member (61) includes an inner circumferential surface (61s) and an outer circumferential surface, the first threaded portion (63) of the first tubular member (61) being positioned at the inner circumferential surface (61s), the second circumferential surface (62s) of the second tubular member (62) includes an inner circumferential surface and an outer circumferential surface (62s), the second threaded portion (64) of the second tubular member (62) being positioned at the outer circumferential surface, the second tubular member (62) includes the axial end portion (the first axial end portion 62a) being positioned within the first tubular member (61), the axial end portion (the first axial end portion 62a) being formed with the engagement portion (72) being used for a rotary operation of the second tubular member (62) relative to the first tubular member (61).

According to the aforementioned construction, the tool is inserted into the first tubular member 61 from a side where the axial end portion 61a of the first tubular member 61 is positioned. Because the tool is engaged with the engagement portion 72 that is provided at the first axial end portion 62a of the second tubular member 62, the first and second tubular members 61, 62 can relatively rotate with each other. Thus, the position adjustment of the spoiler 3 can be performed from the direction where the spoiler 3 is fixed to the upper brackets 14 by the bolts 50.

According to the embodiment, at least one of the first tubular member (61) and the second tubular member (62) is provided with the grip portion (the width-across-flat portion 73) being used for the rotary operation of the second tubular member (62) relative to the first tubular member (61).

According to the aforementioned construction, because (the flat surface portions 73a, 73b configuring) the width-across-flat portion 73 (the grip portion) serves as the operation input portion 80, the position adjustment of the spoiler 3 can be performed from a direction orthogonal to a direction where the spoiler 3 is fixed to the upper brackets 14 by the bolts 50, or orthogonal to an axial direction of the bolt 50.

According to the embodiment, the support mechanism (the link mechanism 12) includes the support member (the upper bracket 14) being fixed to the spoiler (3) and a link member (the link member 11) being rotatably connected to the support member (the upper bracket 14), the support member (the upper bracket 14) is formed by bending a plate material, the support member (the upper bracket 14) including a sidewall portion (42) being connected to the link member (11), the support member (the upper bracket 14) including a support portion (43) being provided with a through hole (51) into which the fixing member (the bolt 50) is inserted, and the support portion (43) includes a first support plate portion (43a) being formed by bending an upper end of the sidewall portion (42), the support portion (43) including a second support plate portion (43b) being formed by bending a lower end of the sidewall portion (42).

According to the aforementioned construction of the spoiler 3 that is supported at the upper portion of the link mechanisms 12, the spoiler device 3 can be downsized while maintaining the high support stiffness. That is, because the first support plate portion 43a that is formed by bending the upper end of the sidewall portion 42 serves as the support portion 43, and because the first and second tubular members 61, 62 are positioned at an upper portion of the support portion 43, the spoiler 3 that is supported at the upper portion of the link mechanisms 12 can maintain high support stiffness. Further, the sidewall portion 42 includes a portion that is positioned lower than the first support plate portion 43a that configures the support portion 43. Because the portion that is positioned lower than the first support plate portion 43a is set with the connection point (X3) relative to the link member 11 (the front link member 15), the upper bracket 14 can be downsized while preventing the interference of the connection point (X3) and the first and second tubular members 61, 62. Because the second support plate portion 43b that is formed by bending the lower end of the sidewall portion 42 serves as the support portion 43, the connection point (X4) relative to the link member 11 (the rear link member 16) is set above the support portion 43. Accordingly, the spoiler device 10 can be downsized in the up-down direction.

The first axial end portion of the first tubular member 61 (the first axial end portion 61a) that is in contact with the support portion 43 is provided with the small diameter portion 71 that is inserted into the through hole 51 to be positioned in the through hole 51 being provided at the support portion 43. According to the construction of this embodiment, the positioning of the first tubular member 61 is easily operated. Thus, the spoiler 3 can be easily fixed to the link mechanisms 12.

The first axial end portion of the first tubular member 61 (the first axial end portion 61a) that is in contact with the support portion 43 is fixed to the support portion 43. Thus, the second tubular member 62 can relatively rotate with the first tubular member 61 without the holding of the first tubular member 61. Accordingly, the spoiler 3 can be further easily fixed to the link mechanisms 12.

The aforementioned embodiment can be modified as follows.

According to the aforementioned embodiment, the spoiler device 10 for a known rear spoiler supports the spoiler 3 on the trunk lid 2 that is positioned at the rear of the vehicle. Alternatively, the mounting position of the spoiler 3 may be desirably changed. For example, the spoiler 3 may be supported on a roof panel. Further, for example, the spoiler 3 may be deployed from or stored in a housing recessed portion that is provided at any other portions of the outer surface S of the vehicle 1, for example, a side surface of the vehicle 1.

According to the aforementioned embodiment, the link mechanisms 12 that move the spoiler 3 to the deployed position so as to lift the rear end portion 3b upper than the front end portion 3a is used as a support mechanism. Alternatively, the construction of the support mechanism can be changed desirably. For example, the spoiler 3 can protrude (lift up) from the outer surface S of the vehicle 1 without changing the inclination angle of the spoiler 3. Alternatively, (the rear end portion 3b of) the spoiler 3 can protrude from the outer surface S of the vehicle 1 by the change of the inclination angle. Further, the link mechanism does not have to be used as the support mechanism. The spoiler 3 that is supported by the link mechanisms 12 can be deployed from and stored in the housing recessed portion 20 by manual operation.

According to the aforementioned embodiment, the right-left pair of the link mechanisms 12 supporting the spoiler 3 is provided at the positions that are spaced apart from each other in the vehicle width direction. Alternatively, the link mechanisms 12 that configure the support mechanism can be any number, for example, one or three and more. The link members 11 that configure the link mechanisms 12 can be any number, for example, one or three and more.

According to the aforementioned embodiment, the first and second tubular members 61, 62 are positioned at the upper portion of the support portion 43 that configures the upper bracket 14. Alternatively, the positions of the first and second tubular members 61, 62 may be changed desirably as long as the first and second tubular members 61, 62 are positioned between the spoiler 3 and the link mechanisms 12.

Figure 16A:
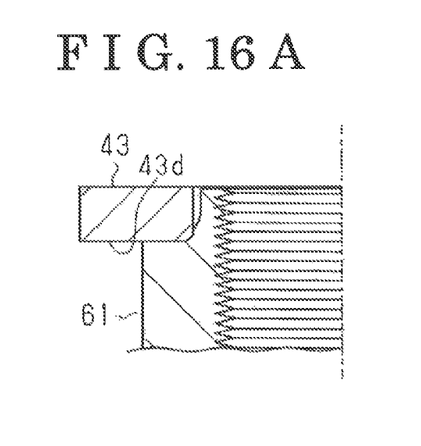
FIG. 16A is an explanatory view illustrating an example of a position of the first tubular member.
Figure 16B:
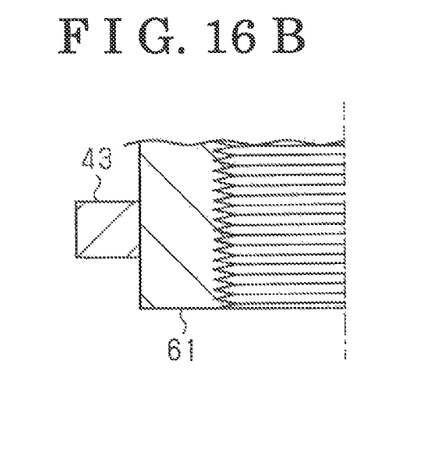
FIG. 16B is another explanatory view illustrating another example of the position of the first tubular member.
Figure 16C:
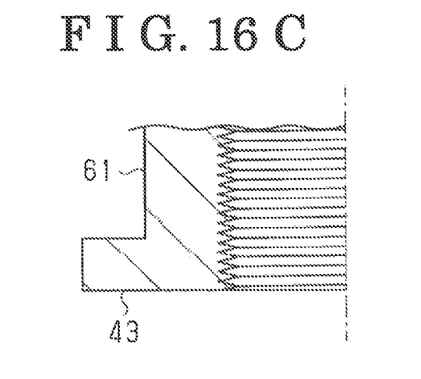
FIG. 16C is further explanatory view illustrating still further example of the position of the first tubular member.

For example, as shown in FIG. 16A, the first tubular member 61 can be in contact with the lower surface 43d of the support portion 43 that configures the upper bracket 14. As shown in FIG. 16B, the first tubular member 61 can be provided in a manner that the first tubular member 61 is inserted into the support portion 43 to be positioned through the support portion 43. As shown in FIG. 16C, the first tubular member 61 and the support portion 43 may be integrally formed. Further, the first tubular member 61 may be fixed to the sidewall portion 42 of the upper bracket 14.

According to the aforementioned embodiment, the first axial end portion of the first tubular member 61 (the first axial end portion 61a) is fixed to the support portion 43. Any fixing means may be applied, for example, adhering or welding. Alternatively, the first tubular member 61 may not be fixed to the support portion 43. The small diameter portion 71 may not be formed at the axial end portion of the first tubular member 61 that is in contact with the support portion 43.

According to the aforementioned embodiment, the second axial end portion of the second tubular member 62 (the second axial end portion 62b) that protrudes outside the first tubular member 61 is provided with the width-across-flat portion 73 that serves as the grip portion being used for rotary operation when the second tubular member 62 relatively rotates with the first tubular member 61. Alternatively, the shape of the second axial end portion of the second tubular member 62 (the second axial end portion 62b) can be desirably changed, for example, a quadrilateral shaft shape or a hexagonal shaft shape as long as the second axial end portion of the second tubular member 62 (the second axial end portion 62b) can be used as a grip portion. Alternatively, the first tubular member 61 may include a grip portion. Further, the first and second tubular members 61, 62 may not include a grip portion.

According to the aforementioned embodiment, the first axial end portion of the second tubular member 62 (the second axial end portion 62a) that is positioned within the first tubular member 61 is provided with the slit-shaped engagement portions 72 that are positioned at two positions that are spaced apart from each other by substantially 180 degrees in the circumferential direction. Alternatively, the number and the shape of the engagement portion 72 can be desirably changed as long as the tool can be engaged with the engagement portion 72 for rotational operation when the second tubular member 62 relatively rotates with the first tubular member 61. The engagement portions 72 can be protruding portions instead of recessed portions. Further, the engagement portions 72 do not have to be included.

According to the aforementioned embodiment, the first tubular member 61 is positioned at the link mechanism 12 while the second tubular member 62 is positioned at the spoiler 3. Alternatively, the second tubular member 62 may be positioned at the link mechanism 12 while the first tubular member 61 may be positioned at the spoiler 3.

According to the aforementioned embodiment, the support portion 43 of the upper bracket 14 is formed with the first support plate portion 43a being formed by bending the upper end of the sidewall portion 42 and with the second support plate portion 43b being formed by bending the lower end of the sidewall portion 42. Alternatively, a sidewall portion may be formed by bending one end of a support portion. In the construction that the spoiler 3 is supported at the upper portion of the link mechanisms 12, the sidewall portion (a first sidewall portion) is favorably formed by bending a first end of the support portion upwardly. The sidewall portion is favorably provided with a second sidewall portion that is formed by bending the first end of the support portion downwardly. Alternatively, the side wall portion is favorably provided with a third sidewall portion that is formed by bending a second end of the support plate portion downwardly.

According to the aforementioned embodiment, each of the lower bracket 13 and the upper bracket 14 is formed by bending a plate member that is made of metal. Alternatively, the materials and the processing methods of the lower bracket 13 and the upper bracket 14 may be changed desirably.

The technical idea and the effect thereof that can be grasped based on the above-described embodiment are described below.

The axial end portion (the first axial end portion 61a) of the first tubular member 61 that is in contact with the support portion 43 is provided with the small diameter portion 71 that is inserted into the through hole 51. According to the construction of this embodiment, the positioning of the first tubular member 61 is easily operated. Thus, spoiler 3 can be easily fixed to the link mechanisms 12.

The axial end portion (the first axial end portion 61a) of the first tubular member 61 that is in contact with the support portion 43 is fixed to the support portion 43. Thus, the second tubular member 62 can relatively rotate with the first tubular member 61. Accordingly, the spoiler 3 can be further easily fixed to the link mechanisms 12.

The support mechanism (the link mechanism 12) includes the support member (the upper bracket 14) being fixed to the spoiler 3 and the link member 11 that is rotatably connected to the support member (the upper bracket 14). The support member (the upper bracket 14) is formed by bending the plate material and is provided with the support portions 43 and the side wall portion 42. The support portion 43 includes the through hole 51 into which the fixing member (the bolt 50) is inserted to be positioned through the through hole 51. The sidewall portion 42 is connected to the link member 11. The sidewall portion 42 is formed by bending one end of the support portion 43 upwardly. In this construction, the connection point X4 relative to the link member 11 may be set above the support portions 43. Because the first and second tubular members 61, 62 are positioned upper than the support portion 43, the spoiler device 10 can be downsized in the up-down direction while maintaining high support stiffness.

The support mechanism (the link mechanism 12) is provided with the plural link members 11 and the third sidewall portion that is formed by bending the second end of the support portion downwardly. In this construction, the connection point (X3) of the second sidewall portion relative to the link member 11 may be formed at the second sidewall portion that is positioned lower than the support portion 43. Accordingly, the support member (the upper bracket 14) may be downsized while preventing the interference of the connection point (X3) and the first and second tubular members 61, 62.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A spoiler device for a vehicle, comprising:
a spoiler;
a support mechanism supporting the spoiler, the support mechanism adjusting the spoiler to be positioned at a deployed position where the spoiler protrudes from an outer surface of the vehicle, the support mechanism adjusting the spoiler to be positioned at a retracted position where the spoiler is retracted within a housing recessed portion, the housing recessed portion being formed at the outer surface of the vehicle;
a fixing member fixing the spoiler to the support mechanism; and
a first tubular member and a second tubular member into which the fixing member is inserted, the first tubular member being provided with a first threaded portion at a first circumferential surface, the second tubular member being provided with a second threaded portion at a second circumferential surface, the first threaded portion and the second threaded portion being threadedly engaged with each other,
wherein:
the first circumferential surface of the first tubular member includes an inner circumferential surface and an outer circumferential surface, the first threaded portion of the first tubular member being positioned at the inner circumferential surface,
the second circumferential surface of the second tubular member includes an inner circumferential surface and an outer circumferential surface, the second threaded portion of the second tubular member being positioned at the outer circumferential surface, and
the second tubular member includes an axial end portion being positioned within the first tubular member, the axial end portion being formed with an engagement portion being used for a rotary operation of the second tubular member relative to the first tubular member.

2. The spoiler device for the vehicle according to claim 1, wherein
the first tubular member includes an inner diameter being larger than a diameter of the fixing member; and
the second tubular member includes an inner diameter being larger than the diameter of the fixing member.

3. The spoiler device for the vehicle according to claim 1, wherein
at least one of the first tubular member and the second tubular member is provided with a grip portion being used for a rotary operation of the second tubular member relative to the first tubular member.

4. The spoiler device for the vehicle according to claim 1, wherein
the support mechanism includes a support member being fixed to the spoiler and a link member being rotatably connected to the support member;
the support member is formed by bending a plate material, the support member including a sidewall portion being connected to the link member, the support member including a support portion being provided with a through hole into which the fixing member is inserted; and
the support portion includes a first support plate portion being formed by bending an upper end of the sidewall portion, the support portion including a second support plate portion being formed by bending a lower end of the sidewall portion.

* * * * *